United States Patent [19]
Versari et al.

[11] 3,747,570
[45] July 24, 1973

[54] SERVO VALVE

[75] Inventors: Werner Rio Versari, Wolfschlugen; Lothar Kirstein, Bad Kreuznach, both of Germany

[73] Assignee: Jos. Schneider & Co. Optische Werke, Bad Kreuznach, Germany

[22] Filed: Oct. 18, 1971

[21] Appl. No.: 190,218

[30] Foreign Application Priority Data
Oct. 22, 1970  Germany.................. P 20 51 753.7

[52] U.S. Cl. .......................................... 137/625.64
[51] Int. Cl. ............................................ F16k 11/00
[58] Field of Search............ 137/625.64, 85, 596.16; 91/365

[56] References Cited
UNITED STATES PATENTS

| | | |
|---|---|---|
| 2,503,447 | 4/1950 | May..................................... 91/365 |
| 2,860,606 | 11/1958 | Ainsworth................. 137/625.64 X |
| 3,311,123 | 3/1967 | Vee Chanytsien et al. 137/625.64 X |
| 3,339,573 | 9/1967 | Bahniuk..................... 137/625.64 X |
| 2,851,997 | 9/1958 | De Mott et al. .............. 137/625.63 |
| 3,650,286 | 3/1972 | Armstrong................. 137/625.63 X |

OTHER PUBLICATIONS
Kinney et al., Feb. 1959, "What You Can Get in Electrohydraulic Servo Valves," Applied Hydraulics & Pneumatics, p. 70.

Primary Examiner—Henry T. Klinksiek
Assistant Examiner—Robert J. Miller
Attorney—Karl F. Ross

[57] ABSTRACT

A working piston in a main cylinder and a pilot piston in an ancillary cylinder are linked to opposite ends of a two-arm lever having a floating fulcrum on the shaft of a torque motor whose energization, resulting in a shift of the pilot piston, gives rise to a fluid flow displacing the working piston in the same sense, thereby transmitting to the lever a reaction force which restores the pilot piston to its normal position. The coupling between the lever and the working piston includes a pair of coil springs whose adjustable pressure determines the restoring force and therefore the ratio of input signal to flow rate. The position of the working piston is stabilized by balanced fluid pressures acting upon opposite lands thereof in the normal position of the pilot piston.

9 Claims, 6 Drawing Figures

Patented July 24, 1973 3,747,570

W. Rio Versari
Lothar Kirstein
*Inventors.*

By Karl G. Ross
*Attorney*

Patented July 24, 1973

W. Rio Versari
Lothar Kirstein
Inventors.

By

Karl J. Ross
Attorney

SERVO VALVE

Our present invention relates to a servo valve of the type wherein a working piston in a main cylinder, controlling the flow of a hydraulic or a pneumatic working fluid to a load, is hydraulically or pneumatically positionable with the aid of a more mobile pilot piston in an ancillary cylinder responding to a controlling force.

In commonly owned application Ser. No. 190,219, filed by one of us (Lothar Kirstein) on 18 Oct. 1971, there has been disclosed a valve of this general character in which, however, the pilot piston is received in an axial bore of the main or working piston. With this compact construction the displacement of the working piston ist directly translated into a motion tending to re-establish the initial position of the shifted pilot piston relative to its cylinder, i.e., to the bore of the working piston. Evidently an arrangement of this type is practical only with relatively large working pistons into which the channel system for the flow of pilot fluid can be readily machined.

The general object of our present invention is to provide, in a servo valve whose pilot piston moves in a stationary cylinder independent of the working piston, simple means of low inertia for transmitting a reaction force from the working piston to the pilot piston in order to restore the latter to its normal position after it has been shifted therefrom by an applied input signal.

According to our invention, an actuator such as a torque motor responsive to a controlling input signal is differentially linked with the two pistons by means of a coupling which, upon a displacement of the actuator, shifts the pilot piston with substantially no change in the position of the working piston; the latter, in response to fluid pressure generated in the off-normal position of the pilot piston, moves in such a sense as to restore the pilot piston to normal through the intermediary of an elastic linkage which advantageously includes a rigid element in tandem with a pair of springs (preferably of the compression type) effective in opposite directions. Adjustment of the stress of these springs enables a change in the length of the stroke executed by the working piston in response to a given change in the magnitude of the controlling signal.

In order to stabilize the working piston in its selected blocking or nonblocking position, balanced fluid pressures may be applied to it in the normal position of the pilot piston. For this purpose, the pilot piston normally defines with its cylinder a pair of throttled passages for stepping down the pressure of the pilot fluid to a fractional value, specifically to half the input pressure acting upon a face of the working piston. The fractional fluid pressure, applied to an oppositely facing land of the working piston, rises or drops upon a shift of the pilot piston in one direction or the other; with the effective area of the land under fractional pressure equaling half the effective area of the piston face exposed to the full fluid pressure, equilibrium is achieved whenever the pilot piston returns to normal. This arrangement is basically similar to the stabilizing system described in the Kirstein application identified above.

The low inertia of such a system of rods and springs enables the construction of a highly sensitive valve operating with minimum hysteresis.

The above and other features of our invention will be described in detail hereinafter with reference to the accompanying drawing in which.

Figure 1:
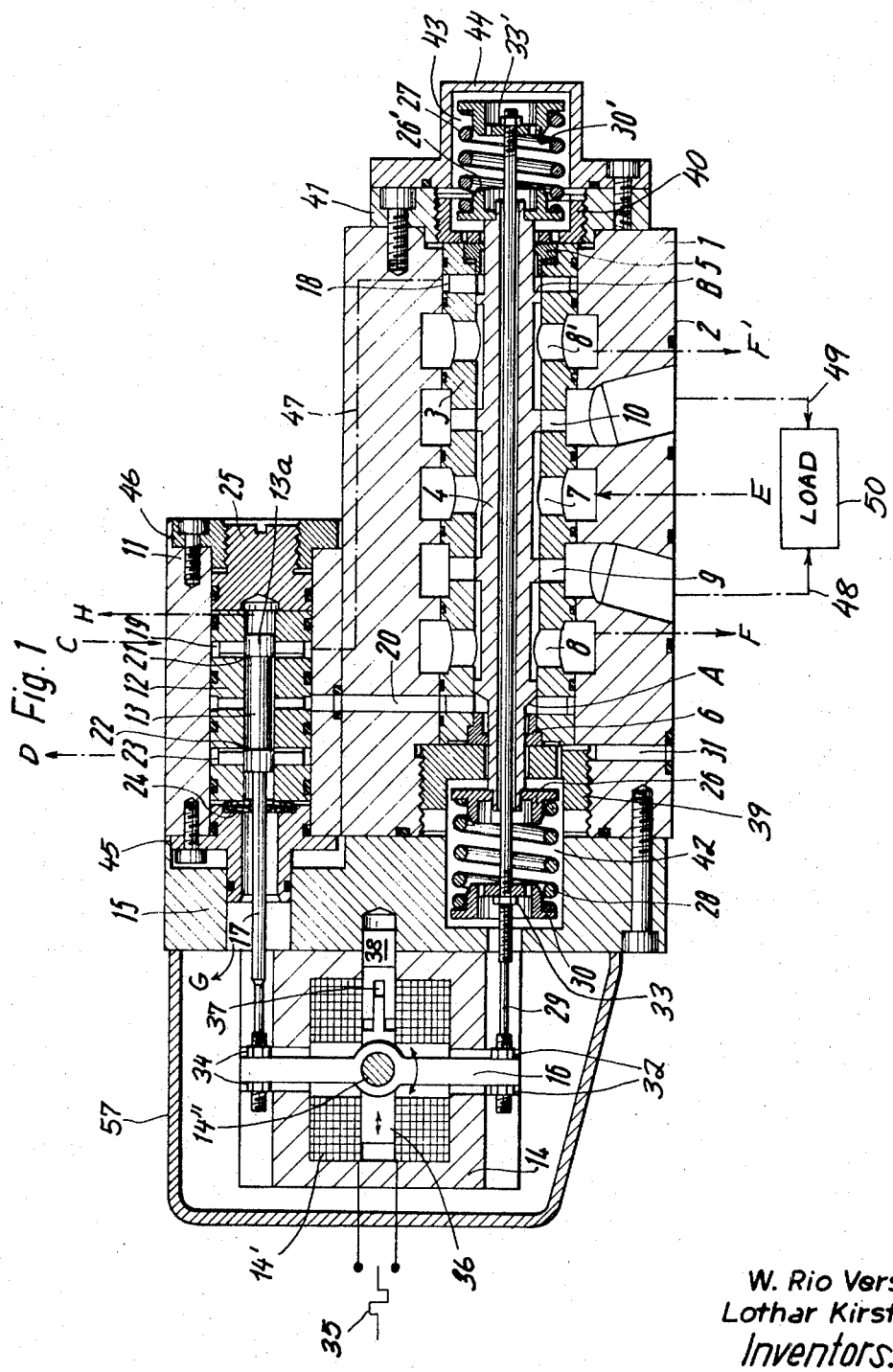
FIG. 1 is an axial sectional view of a servo valve embodying our invention.

The system shown in FIG. 1 comprises a valve block 1 with an outer surface 2 for the attachment of hydraulic or pneumatic conduits serving for the circulation of oil or some other fluid to and from a working cylinder 3 axially traversed by a main piston 4. A similar block 11, rigid with block 1, forms a housing for an ancillary cylinder 12 axially traversed by a pilot piston 13, the two cylinder axes being parallel. Cylinders 3 and 12 have the form of apertured sleeves inserted in respective bores of blocks 1 and 11. The working space of sleeve 3 is bounded by a pair of metallic sealing profiles 5 and 6, each having an inner annular ridge in engagement with a respective piston extremity, these profiles being locked in place by plugs 39, 40 screwed into the block 1 and terminal plate 41 thereof, respectively. Another plate 15, bolted to block 1, defines a spring chamber 42 adjacent one end of piston 4 whose other end enters a similar spring chamber 43 formed between plate 41 and a cap 44.

The space in block 11 accommodating the sleeve 12 is closed by two end caps 45, 46 bolted to that block, cap 45 having a boss received in a bore of plate 15; the position of sleeve 12 in block 11 may be adjusted with the aid of a plug 25, threaded into cap 46, against which the sleeve 12 is axially urged by a pair of Belleville springs 24 inserted between the sleeve and the cap 45.

A cowl 57 fastened to plate 15 surrounds an electromagnetic actuator 14 in the form of a torque motor responding to an input signal 35 applied to its winding 14'. The motor shaft 14" is secured to a slider 36 guided by a slot 37 of a stud 38 which is driven into the plate 15. Shaft 14", which may thus be translated parallel to itself in the axial direction of cylinders 3 and 12, is rigid with a lever 16 adapted to swing through a small angle, in either direction, according to the polarity of the controlling signal 35.

Lever 16, acting as a feedback beam, is connected at its lower end by nuts 32 with piston 4 via a resilient linkage including a rigid rod 29 traversing an axial bore of the piston, a pair of spring seats 30, 30' secured to rod 29 at opposite ends of the piston, and a pair of coil springs 27, 28 bearing upon these opposite piston ends. Spring 28, received in chamber 42, is compressed between seat 30 and a similar seat 26 on the left-hand extremity of piston 4; spring 27 is similarly mounted in chamber 43 on seat 30' and a similar seat 26' on the right-hand piston extremity. The position of spring seat 30, and therefore the compression of spring 28, may be adjusted with the aid of a nut 33 engaging a threaded portion of rod 29; a similar nut 33' threaded onto the free end of this rod, enables adjustment of the position of spring seat 30' and therefore of the pressure of spring 27.

The upper end of lever 16 is connected by nuts 34 and a rod 17 with piston 13. It will be understood that the linkages coupling the lever 16 with the two pistons, as well as the guide means 36 – 38, should have sufficient flexibility and/or play to allow the lever to swing within a limited angular range to an extent proportional to the applied signal.

Pilot piston 13 has a pair of heads 13a, 13b defining, together with radial ports 19 and 23 in cylinder 12, a pair of throttled passages 21 and 22 communicating with a central bore 20 which leads from cylinder 12 to cylinder 3 and terminates at a land A defined by an annular shoulder of piston 4. An oppositely facing shoulder B of this piston forms a land subjected, via a channel diagrammatically indicated at 47, to the full input pressure of pilot fluid from an external pump (not shown) admitted to port 19 as symbolized by an arrow C. Another arrow D shows the venting of port 23 to a sump or the low-pressure side of the pump. With piston 13 in its illustrated neutral position, clearances 21 and 22 are of the same width (which may be about one-thirtieth the diameter of ports 19 and 23) so as to step down the fluid pressure to half its original value, this fractional pressure acting upon the land A with a tendency to shift the piston 4 to the right. That tendency is counteracted by the pressure acting upon piston face B whose effective area is half that of land A so that the two forces are in balance under these circumstances. Piston 4 is thereby immobilized in any position into which it had previously been displaced.

Working fluid, which may be delivered by the same pump as the pilot fluid or by a different source, enters a central port 7 of cylinder 3 (as symbolized by an arrow E) which is flanked by two discharge ports 8, 8' vented to the sump (arrows F, F'). Two working ports 9 and 10 communicate with respective conduits 48, 49 terminating at opposite sides of a load 50 which is to be displaced by the fluid in one sense or another, according to the applied input signal 35. It will be apparent that the flow of working fluid to the load 50 is blocked in the illustrated position of piston 3 but that a shift of this piston to the left or the right admits fluid to conduit 48 or 49, respectively, while venting the opposite conduit to the sump.

The axial bore of ancillary cylinder 12 is also vented to the sump, at opposite ends of piston 13, as symbolized by arrows G and H; the venting of the closed end of the bore may take place through internal passages of the piston. Thus, only minor resistances oppose the axial displacement of piston 13 and slider 36 upon a swinging of lever 16 in response to signal 35, with the lower end of this lever moving only slightly against the resistance of linkage 27 – 29 and the arrested piston 4. As soon as the piston position changes in response to a variation of fluid pressure in bore 20, however, the motion of piston 4 is fed back to lever 16 at a rate determined by the compressibility of coupling springs 27, 28 as adjusted with the aid of nuts 33, 33'. This adjustment, therefore, establishes the extent to which piston 4 must shift in order to restore the piston 13 to its normal position. In view of the low resistances involved, springs 27,28 may be relatively weak.

Spring chambers 42, 43 are also vented to the sump with the aid of respective drainage channels as illustrated at 31 for chamber 42.

Figure 2:
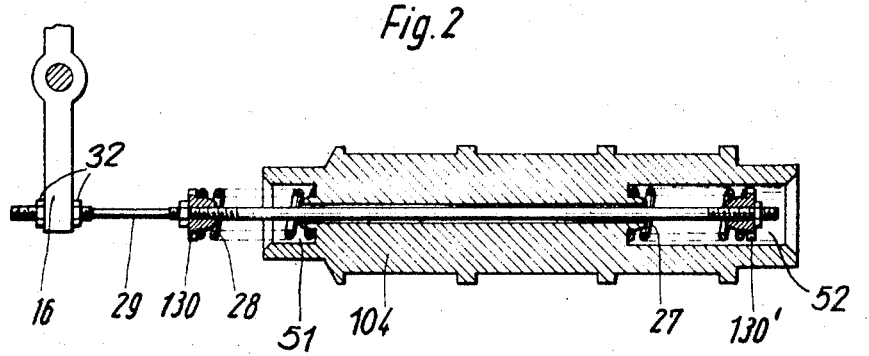
FIGS. 2 – 6 are sectional views of part of the assembly of FIG. 1, showing different forms of a working piston and of an associated elastic linkage.

FIG. 2 shows a modified working piston 104 whose axial bore has enlarged terminal portions 51 and 52 accommodating a part of spring 28 and all of spring 27, respectively. These springs bear with their inner ends directly upon the piston body and have their outer ends supported by adjustable spring seats 130, 130'.

Figure 3:
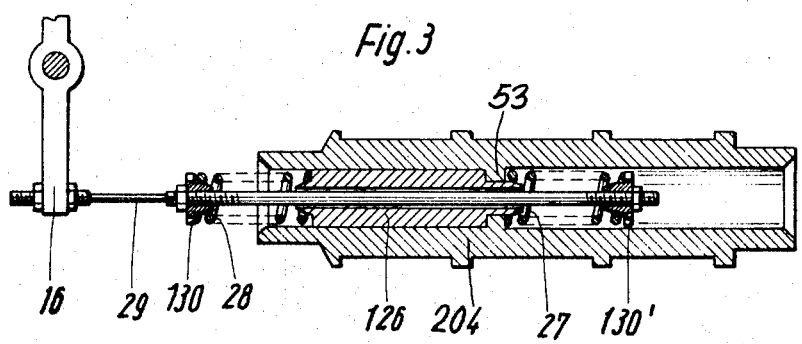

In the modification of FIG. 3, the enlarged axial bore of a working piston 204 is subdivided by an inner partition 53 into two compartments, the left-hand compartment being occupied by a spacer 126 to whose opposite ends the springs 27 and 28 are anchored.

Figure 4:
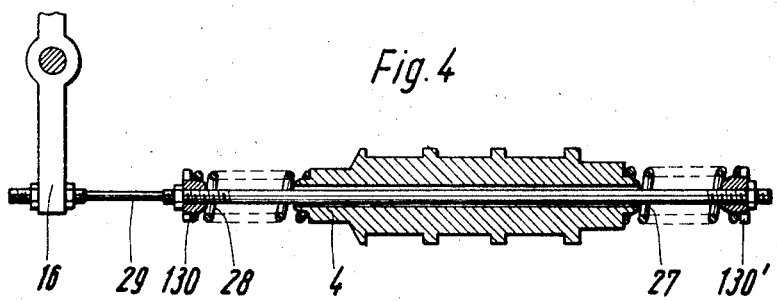

FIG. 4 shows the piston 4 of FIG. 1 with omission of seats 26 and 26', the springs 27 and 28 being seated directly on the reduced ends of that piston confronting the adjustable seats 130 and 130'.

Figure 5:
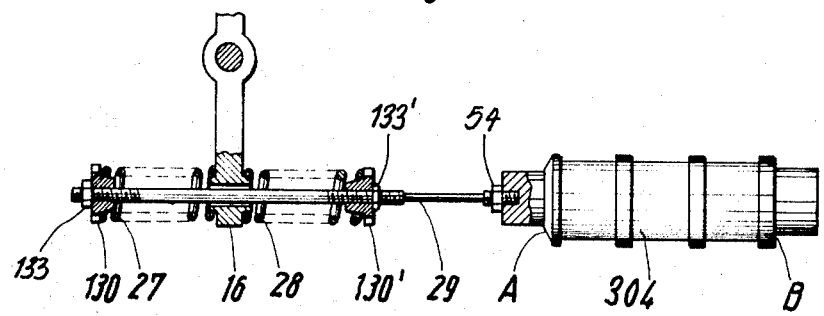

FIG. 5 shows a piston 304 without axial bore, the left-hand end of this piston being secured by a screw 54 to the rod 29 which passes through a transverse bore of lever 16; the springs 27 and 28 bear from opposite sides upon the lower end of that lever under a pressure adjustable with the aid of nuts 133, 133' engaging seats 130, 130'.

Figure 6:
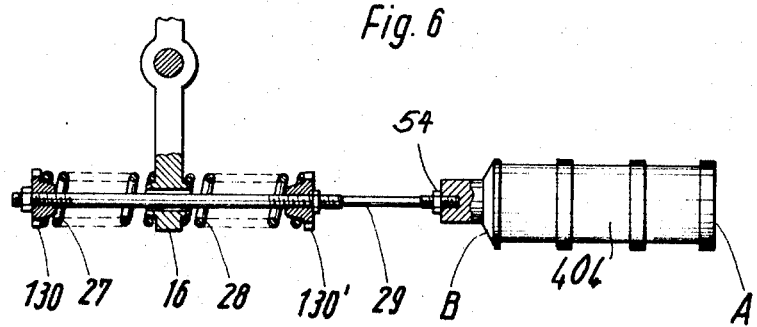

In FIG. 6 we have shown an arrangement which is similar to that of FIG. 5, except for the use of a piston 404 which differs from piston 304 by the interchange of the positions of lands A and B. Land A, which again has the larger effective area, is constituted by the full end face of piston 404 and is subjected to the fractional fluid pressure of bore 20 in FIG. 1; land B is an annular shoulder of half the area of face A communicating with the port 18 (FIG. 1) to which the full fluid pressure is applied. The pilot fluid must then be fed to port 23 and discharged via port 19, unless the first-class lever 16 is replaced by a second-class lever.

Although the arms of lever 16 have been shown to be of the same length, such a central positioning of shaft 14'' is not indispensable; in fact, the sensitivity of our improved valve may be modified by a suitable change in the arms ratio.

We claim:

1. A valve for controlling the flow of a working fluid to a load in response to an input signal, comprising:
   a main cylinder provided with a working piston axially displaceable therein for the alternate blocking and unblocking of channels leading from a supply of high-pressure working fluid to the load;
   an ancillary cylinder provided with a pilot piston axially displaceable therein for controlling the admission of a pilot fluid to a land of said working piston to displace the latter; said pistons being parallel to each other;
   signal-responsive actuating means movable in either of two directions; and
   coupling means differentially linking said actuating means with said pistons for translating a displacement of said working piston by said pilot fluid, due to a shift of said pilot piston from a normal position, into a reaction force substantially restoring said pilot piston to said normal positon, said coupling means including an elastic linkage between said actuating means and said working piston and further including a lever swingable about a floating fulcrum by said actuating means, said pistons being connected to said lever at different points.

2. A valve as defined in claim 1 wherein said pistons are linked with said lever at opposite ends thereof, said actuating means comprising a torque motor with a transversely movable shaft secured to an intermediate point of said lever.

3. A valve as defined in claim 2 wherein said elastic linkage engages said piston and includes a rigid element, spring means in tandem therewith and adjusting means for varying the stress of said spring means.

$. A valve as defined in claim 3 wherein said spring means comprises a pair of compression springs each effective in a respective direction of movement of said working piston to transmit the motion thereof to said lever.

5. A valve as defined in claim 4 wherein said working piston has a throughgoing axial bore traversed by said element, said springs bearing upon opposite extremities of said working piston.

6. A valve as defined in claim 5 wherein said bore has enlarged terminal portions at least partly accommodating said springs in the extremities of said working piston.

7. A valve as defined in claim 4 wherein said lever has a transverse bore traversed by said element, said springs bearing upon said lever from opposite sides.

8. A valve as defined in claim 1 wherein said working piston has a face subjected to a countervailing fluid force substantially balancing the force of said pilot fluid acting upon said land in said normal position of said pilot piston.

9. A valve as defined in claim 8 wherein said face has an effective area equal to half that of said land, said pilot piston forming with said ancillary cylinder a pair of throttled passages for stepping down the pressure of the pilot fluid reaching said land to half the fluid pressure reaching said face in said normal position of said pilot piston.

* * * * *